United States Patent

[11] 3,608,921

| [72] | Inventor | James D. Wilson |
| | | Long Beach, Calif. |
| [21] | Appl. No. | 844,771 |
| [22] | Filed | July 25, 1969 |
| [45] | Patented | Sept. 28, 1971 |
| [73] | Assignee | Banner Metals, Inc. |
| | | Compton, Calif. |

[54] DOLLY
1 Claim, 2 Drawing Figs.

[52] U.S. Cl. .................................................. 280/79.1
[51] Int. Cl. .................................................. B62b 5/00
[50] Field of Search ........................................ 280/79.1,
79.2, 33.99; 16/31

[56] References Cited
UNITED STATES PATENTS
781,427   1/1905   Hussey ....................... 280/79.1

| 1,273,214 | 7/1918 | Gleason .................. | 280/79.1 |
| 1,339,109 | 5/1920 | Irrgang .................. | 280/79.1 |
| 3,208,768 | 9/1965 | Hulbert .................. | 280/79.1 |
| 3,523,694 | 8/1970 | Oliver .................... | 280/33.99 |

*Primary Examiner*—Benjamin Hersh
*Assistant Examiner*—Robert R. Song
*Attorney*—Jessup & Beecher

ABSTRACT: An improved dolly is provided for supporting, for example, a stack of receptacles, and which is constructed in an improved manner to incorporate a pair of side strips, each formed into a channel, so as to permit the dolly to be stacked easily on top of a similar dolly for shipping convenience, and to incorporate a pair of upstanding, transverse end strips, which serve to prevent the receptacles and the stacked dollies from sliding or rolling off the dolly.

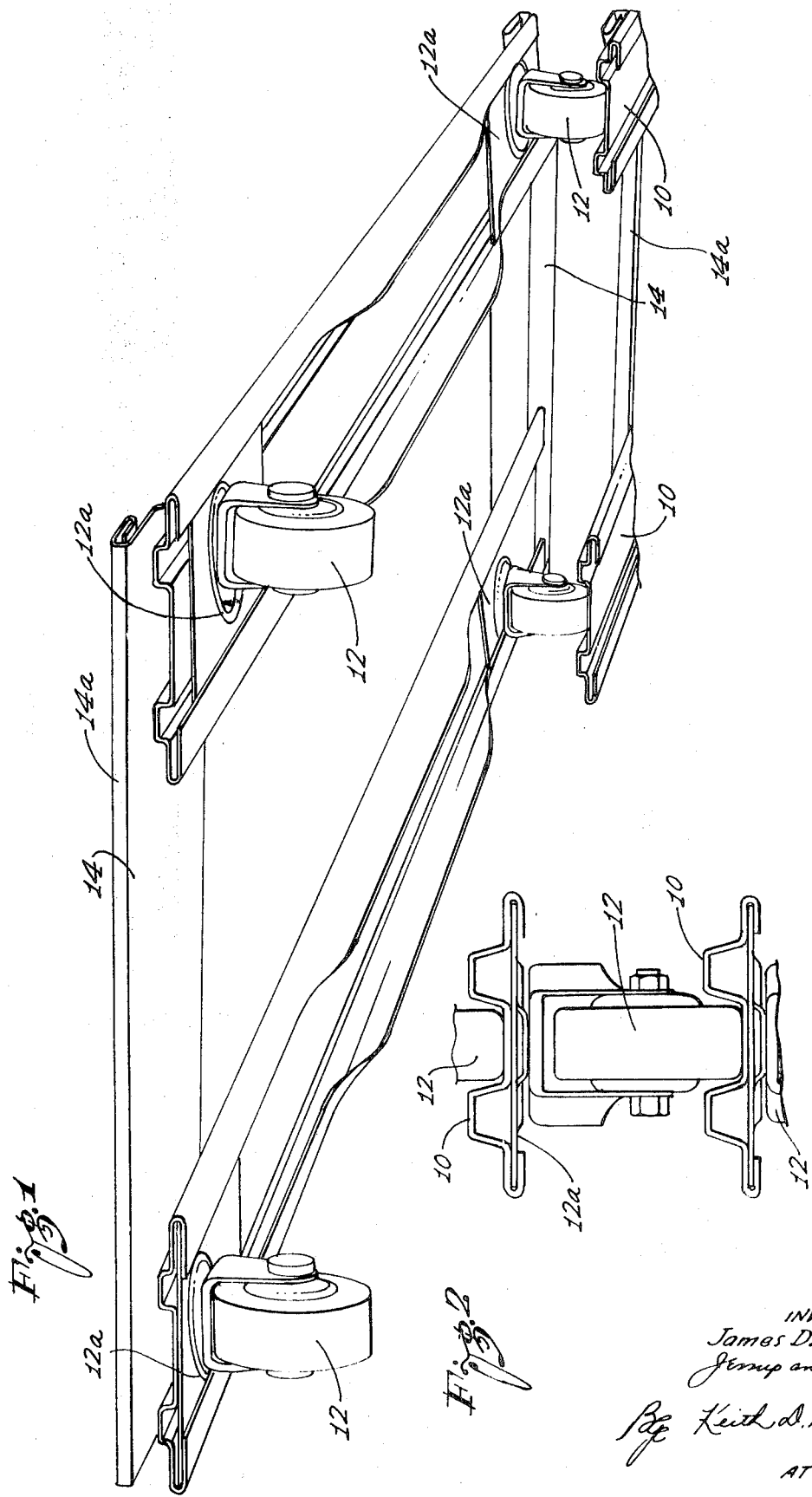

DOLLY

BACKGROUND OF THE INVENTION

An improved dolly is described in copending application Ser. No. 548,693, filed May 9, 1966, for supporting a stack of receptacles. The receptacles may be of the type disclosed in U.S. Pat. No. 3,219,232. The dolly described in the copending application includes a rectangular carriage which is supported on casters.

As described in the copending application, the dolly may be used for transporting bakery goods from the bakery to the market, or for any other purpose. When so used, the bakery goods are loaded into the receptacles which are stacked on the dolly. The dolly and its stack of loaded receptacles are then transported to the market, and they are wheeled to an appropriate place in the market for easy access to the goods by the customers.

After the receptacles are empty, they may be nested into one another in individual tiers for convenient transport back to the bakery. The improved construction of the dolly of the present invention permits the dollies likewise to be easily stacked on top of one another to form a self-supporting tier of dollies, for the convenient return of the dollies to the bakery with minimum space requirements.

A further feature of the invention is the simplified construction of the dolly to be described, which as mentioned above is formed of a pair of channellike side strips and a pair of upstanding transverse end strips, the side strips being secured to the caster assemblies by a simple crimping action so that welding, or the like, is not required.

Briefly stated, the present invention provides an improved, relatively inexpensive dolly, which is rigid and rugged in its construction, and which has the ability to be easily stacked with other like dollies into a stable self-supporting tier.

BRIEF DESCRIPTION OF THE DRAWINGS

FIG. 1 is a perspective view of an improved dolly constructed in accordance with the concepts of the present invention, the view being taken from a point under the dolly, and also showing a part of a lower dolly to illustrate the stacking concept of the dolly; and FIG. 2 is a fragmentary end view showing the manner in which the dolly of FIG. 1 is supported on top of a lower dolly, and also the manner in which the caster assemblies are mounted onto the dolly carriage.

DETAILED DESCRIPTION OF THE ILLUSTRATED EMBODIMENT

In the dolly illustrated in the drawing, for example, a pair of side strips 10 formed of any appropriate metal such as steel, are provided. The strips 10 form the side strips for the dolly. As illustrated, the side strips 10 are shaped to provide longitudinal channels at each end of each side strip. These channels receive the casters 12 of an upper similar dolly, when one dolly is stacked on the other. The stacking may be easily accomplished, merely by setting one dolly on top of the other, and rolling the uppermost dolly into place with the wheels being trapped in the channels formed by the side strips.

The casters 12 are part of a subassembly which may have any known construction, and which includes a flat platelike member 12a, with the caster 12 being swively mounted on the underside of the platelike member 12a for rotation about a vertical axis. In order to preclude any necessity for welding, or the like, the side strips 10 are provided with depending edges 10a, and these depending edges are crimped over at each end of each side strip to engage the platelike member 12a of the corresponding caster assembly, as shown. In this way, the individual dollies may be easily constructed by means of a simple crimping action.

The carriage of the individual dollies has a rectangular configuration. and also includes a pair of end strips 14 which are welded, or otherwise affixed to the ends of the side strips, so as to provide a rigid rectangular carriage. The end strips 14 have an upstanding edge 14a, and this edge serves to retain the lowermost receptacle on the dolly, when a stack of receptacles is supported on the dolly. The upstanding edges 14a also serve to limit the movement of the dollies when one is stacked on the other.

Therefore, the improved dolly shown in FIGS. 1 and 2 is one in which a stack of receptacles may be placed, and held firmly in place, with the lowermost receptacle being retained on the dolly between the upstanding edges 14a of the transverse end strips 14.

Also, when it is desired to load one dolly on another for stacking purposes, it is merely necessary to roll the uppermost dolly along the channels formed in the side strips 10 of the lowermost dolly, until the casters 12 of the uppermost dolly engage the end strip 14a of the lowermost dolly, at which time the outer end of the uppermost dolly may be dropped into place so that the two become stacked into a stable relationship. In this way, other dollies can be stacked to provide a convenient stable tier of dollies for convenient return to the distribution center.

The invention provides, therefore, an extremely simple dolly construction which comprises the end strips and the side strips welded or otherwise attached to one another to form a rectangular carriage. The caster assemblies are simply attached to the side strip by the aforesaid crimping action. The resultant assembly provides an efficient and suitable dolly for supporting a stack of receptacles, as described above, and also provides a dolly construction which facilitates the stacking of a plurality of like dollies on top of one another for shipping purposes.

What is claimed is:

1. A dolly including a rectangular carriage, said carriage comprising a pair of spaced and parallel side strips each formed to define a longitudinally extending channel at least at each end thereof, and a pair of upstanding end strips extending transversely of said side strips and secured to the ends of said side strips, four caster assemblies secured to the corners of said carriage, in which each of said caster assemblies includes a platelike upper member, and said side strips include depending edges crimped over the platelike upper members of said caster assemblies to secure said caster assemblies to said carriage.